US007191319B1

(12) United States Patent
Dwyer et al.

(10) Patent No.: US 7,191,319 B1
(45) Date of Patent: Mar. 13, 2007

(54) SYSTEM AND METHOD FOR PRELOADING CACHE MEMORY IN RESPONSE TO AN OCCURRENCE OF A CONTEXT SWITCH

(75) Inventors: Lawrence D. K. B. Dwyer, South San Francisco, CA (US); Michael L. Ziegler, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 301 days.

(21) Appl. No.: 09/631,174

(22) Filed: Aug. 2, 2000

(51) Int. Cl.
*G06F 9/312* (2006.01)

(52) U.S. Cl. ..................................................... 712/228
(58) Field of Classification Search ................. 712/228
See application file for complete search history.

(56) References Cited

U.S. PATENT DOCUMENTS

| 4,884,197 | A |   | 11/1989 | Sachs et al. ................ 364/200 |
| 5,535,397 | A |   | 7/1996 | Durante et al. ............. 395/740 |
| 5,727,211 | A | * | 3/1998 | Gulsen ........................ 709/108 |
| 5,802,568 | A |   | 9/1998 | Csoppenszky .............. 711/136 |
| 5,809,522 | A | * | 9/1998 | Novak et al. ................ 711/118 |
| 6,035,378 | A |   | 3/2000 | James ......................... 711/147 |
| 6,092,153 | A | * | 7/2000 | Lass ............................. 711/133 |
| 6,205,543 | B1 | * | 3/2001 | Tremblay et al. ........... 712/228 |
| 6,587,937 | B1 | * | 7/2003 | Jensen et al. ................ 711/173 |
| 6,738,865 | B1 | * | 5/2004 | Burton et al. ................ 711/133 |

OTHER PUBLICATIONS

InstantWeb. Online Computing Dictionary. Copyright dates vary and are shown on at the end of each term. http://www.instantweb.com/foldoc/index.html☐☐Search Terms: x86, Intel 80×86, Intel 8086, and Intel 486.*
Free On-Line Dictionary of Computing (FOLDOC). © 1996. http://www.instantweb.com/foldoc/foldoc.cgi?computer+dictionary search term: pipeline.*

* cited by examiner

*Primary Examiner*—Eddie Chan
*Assistant Examiner*—Aimee J. Li

(57) ABSTRACT

In a multitasking computer system, data is preloaded into cache memory upon the occurrence of a context switch. To this end, processing circuitry stops executing a computer program during a first context switch in response to a first context switch command. Later, the processing circuitry resumes executing the computer program during a second context switch in response to a second context switch command. The memory control circuitry, in response to the second context switch command, identifies an address of computer memory that is storing a data value previously used to execute an instruction of the computer program prior to the first context switch. The memory control circuitry then retrieves the data value from the computer memory and stores the retrieved data value in the cache memory. Accordingly, the retrieved data value is available to the processing circuitry for use in executing instructions of the computer program after the second context switch without the processing circuitry having to request retrieval of the foregoing data value.

22 Claims, 6 Drawing Sheets

SYSTEM AND METHOD FOR PRELOADING CACHE MEMORY IN RESPONSE TO AN OCCURRENCE OF A CONTEXT SWITCH

BACKGROUND OF THE INVENTION

1. Field of the Invention

The present invention generally relates to computer processing techniques and, in particular, to a system and method for enabling more efficient execution of a computer program by preloading, in response to an occurrence of a context switch, cache memory with data that is likely to be used to execute the computer program after the context switch.

2. Related Art

Instructions of a computer program are typically executed by a processing unit within a computer system. To execute the instructions, the processing unit utilizes data that may be stored in various memory locations, such as cache memory, main memory, disk memory, etc. Cache memory, as known in the art, resides close to and often on the same board as the processing unit. Therefore, data usually can be written to and retrieved from cache memory faster than from memory outside of the processing unit, such as main memory, disk memory, etc.

When the processing unit executes an instruction that writes to or reads from an address in memory, the processing unit first analyzes the cache memory to determine whether the data of the address is stored in cache memory. If this data is stored in cache memory, then the instruction can be quickly executed. In this regard, if the executing instruction is a read instruction, then the foregoing data is retrieved from cache memory. If the executing instruction is a write instruction, then the foregoing data is overwritten.

However, if the data of the address to be written to or read from is not located in the cache memory, then the processing unit issues a retrieval request to request retrieval of the foregoing data. In response to the retrieval request, a memory system manager searches for the requested data in memory outside of the processing unit. While the memory system manager is searching for the requested data, any detected instruction writing to or reading from the address of the requested data is usually stalled in the processing unit. Once the requested data has been located by the memory system manager, the requested data is retrieved and stored in a cache line of the cache memory. As known in the art, a "cache line" is a set of one or more data values stored in the cache memory. Once the requested data is stored in a cache line of the cache memory, the stalls on any of the instructions writing to or reading from the address of the requested data can usually be removed.

To enable the processing unit to determine whether data utilized by an instruction is stored in the cache memory, the cache memory usually includes mappings that are correlated with the data stored in the cache memory and that identify memory locations outside of the processing unit from which the data was originally retrieved or to which the data is ultimately stored. In this regard, when a data value is retrieved from memory outside of the processing unit and stored in the cache memory, a mapping is generated that identifies the memory location from which the data value is retrieved and that identifies the cache memory location where the data value is stored in cache memory. The mapping can later be used by the processing unit to determine whether or not the data value of a particular address is stored in cache memory.

For example, when the processing unit is executing an instruction that utilizes data stored at a particular address identifying a memory location outside of the processing unit, the processing unit can determine whether the required data is stored in cache memory by analyzing the mappings. If one of the mappings identifies the particular address, then the required data value has already been stored in the cache memory, and the processing unit, therefore, does not need to issue a retrieval request to retrieve the required data value from memory outside of the processing unit. Instead, the processing unit can retrieve the data value stored at the cache memory location identified by the foregoing mapping.

It is well known that the execution of a computer program by a processing unit can be temporarily stopped to allow the processing unit to execute instructions from another computer program. In a multitasking computer system, multiple computer programs are allowed to run in an interleaved fashion such that the multiple computer programs appear to run simultaneously to the user. To achieve this, the operating system alternates which programs are executed by the processing unit.

For example, assume that a computer system is running two computer programs in an interleaved fashion. The processing unit in the computer system initially executes instructions from one of the programs. At some point, the operating system induces a context switch, in which the processing unit stops executing instructions from the first computer program and begins to execute instructions from the second computer program. Later, the operating system induces another context switch, in which the processing unit stops executing instructions from the second computer program and begins to execute instructions from the first computer program. The execution of instructions from the two computer programs is alternated in this way until one or both of the programs terminates or until another computer program is invoked. It should be noted that any number of computer programs can share the processing unit according to the foregoing techniques.

While the processing unit is executing a program, certain information is maintained in control registers within the processing unit. Such information is commonly referred to as "the machine state." When a computer program is context switched out (i.e., when execution of the computer program is halted in response to an occurrence of a context switch), the machine state that existed at the time of the context switch is stored to memory outside of the processing unit. When this same computer program is later context switched in (i.e., when execution of the computer program resumes in response to an occurrence of another context switch), the foregoing machine state is retrieved and loaded into the control registers so that the execution of the computer program may resume without errors.

However, when a computer program is context switched in during a context switch, the cache memory usually includes data retrieved in response to execution of instructions from the previously executed computer program (i.e., the computer program that is context switched out during the same context switch). Therefore, it is not likely that the cache memory contains data useful for the execution of the computer program that is context switched in. As a result, when instructions from this computer program are initially executed after the context switch, it is likely that numerous retrieval requests will be issued, and it is, therefore, likely that numerous stalls will occur. The stalls significantly impact the performance of the processing unit. Once a significant amount of data is stored in the cache memory in response to execution of the computer program that is context switched in, the number of retrieval requests is likely to decrease, and the number of stalls are, therefore, likely to decrease, as well.

Thus, a heretofore unaddressed need exists in the industry for providing a system and method of reducing the adverse impact of stalls that initially occur after a context switch.

SUMMARY OF THE INVENTION

The present invention overcomes the inadequacies and deficiencies of the prior art as discussed hereinbefore. Generally, the present invention provides a system and method for enabling more efficient execution of a computer program by preloading, in response to an occurrence of a context switch, cache memory with data that is likely to be used to execute the computer program after the context switch.

In architecture, the system of the present invention utilizes processing circuitry, cache memory, computer memory, and memory control circuitry. The processing circuitry executes computer programs in an interleaved fashion. Accordingly, the processing circuitry stops executing a computer program during a first context switch in response to a first context switch command. Later, the processing circuitry resumes executing the computer program during a second context switch in response to a second context switch command.

The memory control circuitry, in response to the second context switch command, identifies an address of the computer memory that is storing a data value previously used to execute an instruction of the computer program prior to the first context switch. The memory control circuitry then retrieves the data value from the computer memory and stores the retrieved data value in the cache memory. Accordingly, the retrieved data value is available to the processing circuitry for use in executing instructions of the computer program after the second context switch without the processing circuitry having to request retrieval of the foregoing data value.

In accordance with another feature of the present invention, the memory control circuitry selects the foregoing data value for retrieval based on a determination that the retrieved data value was used to execute an instruction of the computer program within a specified time period before the first context switch.

The present invention can also be viewed as providing a method for efficiently executing instructions of computer programs. The method can be broadly conceptualized by the following steps: executing instructions from a computer program; halting the executing step during a first context switch in response to a first context switch command; resuming the executing step during a second context switch in response to a second context switch command; maintaining a plurality of mappings; correlating, via the mappings, data values stored in a cache memory with memory addresses of memory locations outside of the cache memory; storing the mappings in the computer memory in response to said first context switch command; retrieving, based on the mappings and in response to the second context switch command, at least one data value from at least one of the addresses identified by the mappings; and storing the one retrieved data value in the cache memory.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

In general, the present invention provides a system and method for preloading cache memory in response to an occurrence of a context switch. The data preloaded into the cache memory is preferably associated with the program being context switched in. Therefore, when execution of the program begins after the context switch, it is likely that at least some of the data needed to execute the instructions of the program is already stored in the cache memory, resulting in fewer stalls.

Figure 1:
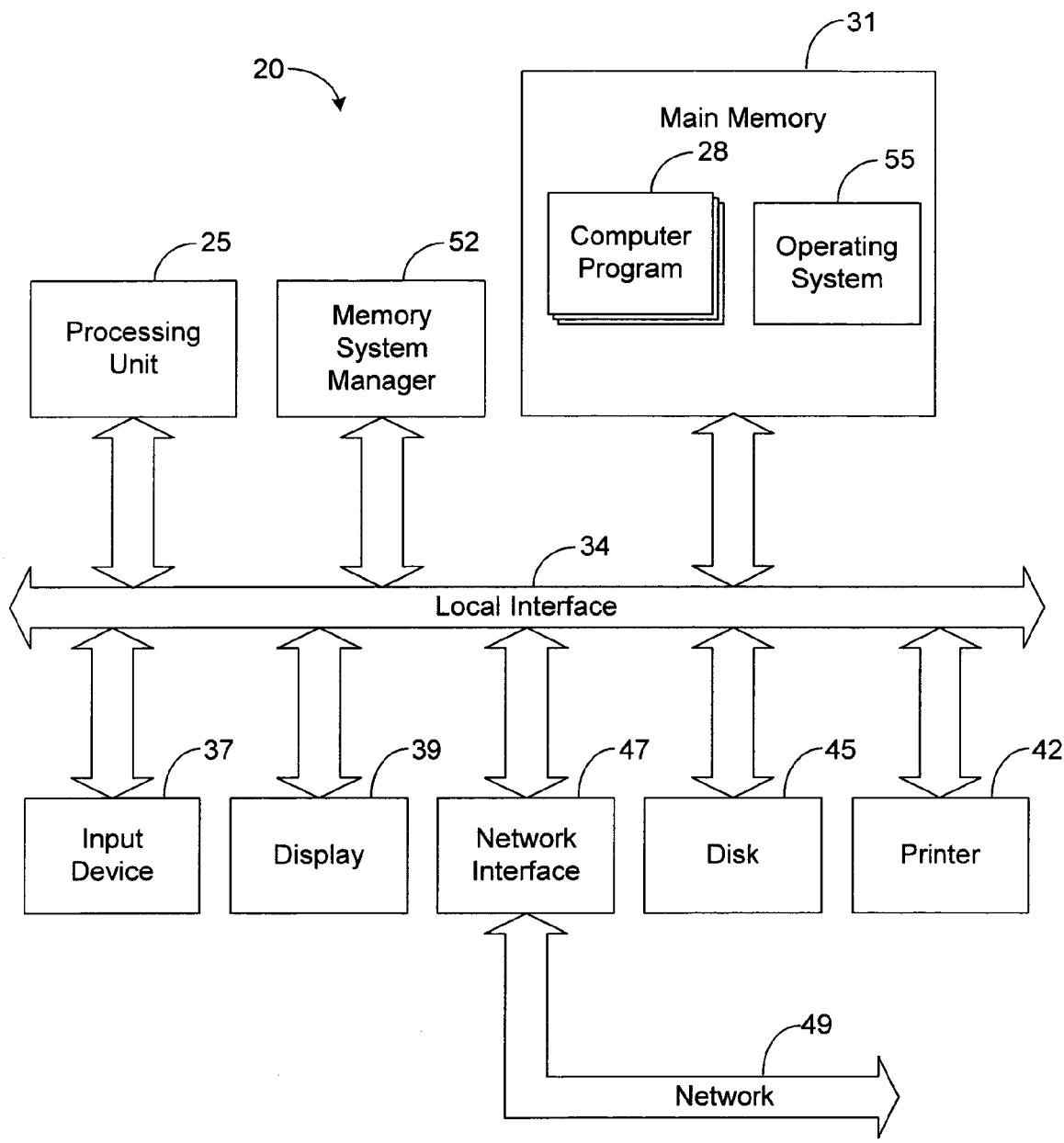
FIG. 1 is a block diagram illustrating a conventional computer system.

FIG. 1 depicts a conventional computer system 20. The computer system 20 of FIG. 1 comprises one or more processing units 25 designed to execute instructions of one or more computer programs 28 stored in main memory 31 or some other suitable memory location. The processing unit 25 communicates to the other elements within the system 20 via a local interface 34, which can include one or more buses.

An input device 37, for example, a keyboard or a mouse, can be used to input data from a user of the system 20, and a screen display 39 or a printer 42 can be used to output data to the user. A disk storage mechanism 45 can be connected to the local interface 34 to transfer data to and from a nonvolatile disk (e.g., magnetic, optical, etc.). The system 20 can be connected to a network interface 47 that allows the system 20 to exchange data with a network 49.

The computer system 20 also includes a memory system manager 52, which is designed to control the retrieval of data from and the storage of data to the memory resources, such as the main memory 31 and disk storage mechanism 45, for example. As an example, when the processing unit 25 produces data to be stored, the memory system manager 52 is designed to determine where the data is to be stored and to store the data in the appropriate address. Furthermore, when the processing unit 25 issues a retrieval request (i.e., a request to retrieve data), the memory system manager 52 is designed to locate and retrieve the requested data. The memory system manger 52 then transmits the requested data to the processing unit 25 for further processing. In some embodiments, the memory system manager 52 is located within the processing unit 25.

An operating system 55 controls the allocation and usage of the processing unit 25 and other resources of the computer system 20. The operating system 55 acts as an interface to the processing unit 25 and controls which data is transmitted to the processing unit 25. For example, the operating system 55 controls when a program 28 is executed by controlling when instructions from the program 28 are transmitted to and interfaced with the processing unit 25. The functionality and operation of the operating system 55 is generally well known in the art.

Figure 2:
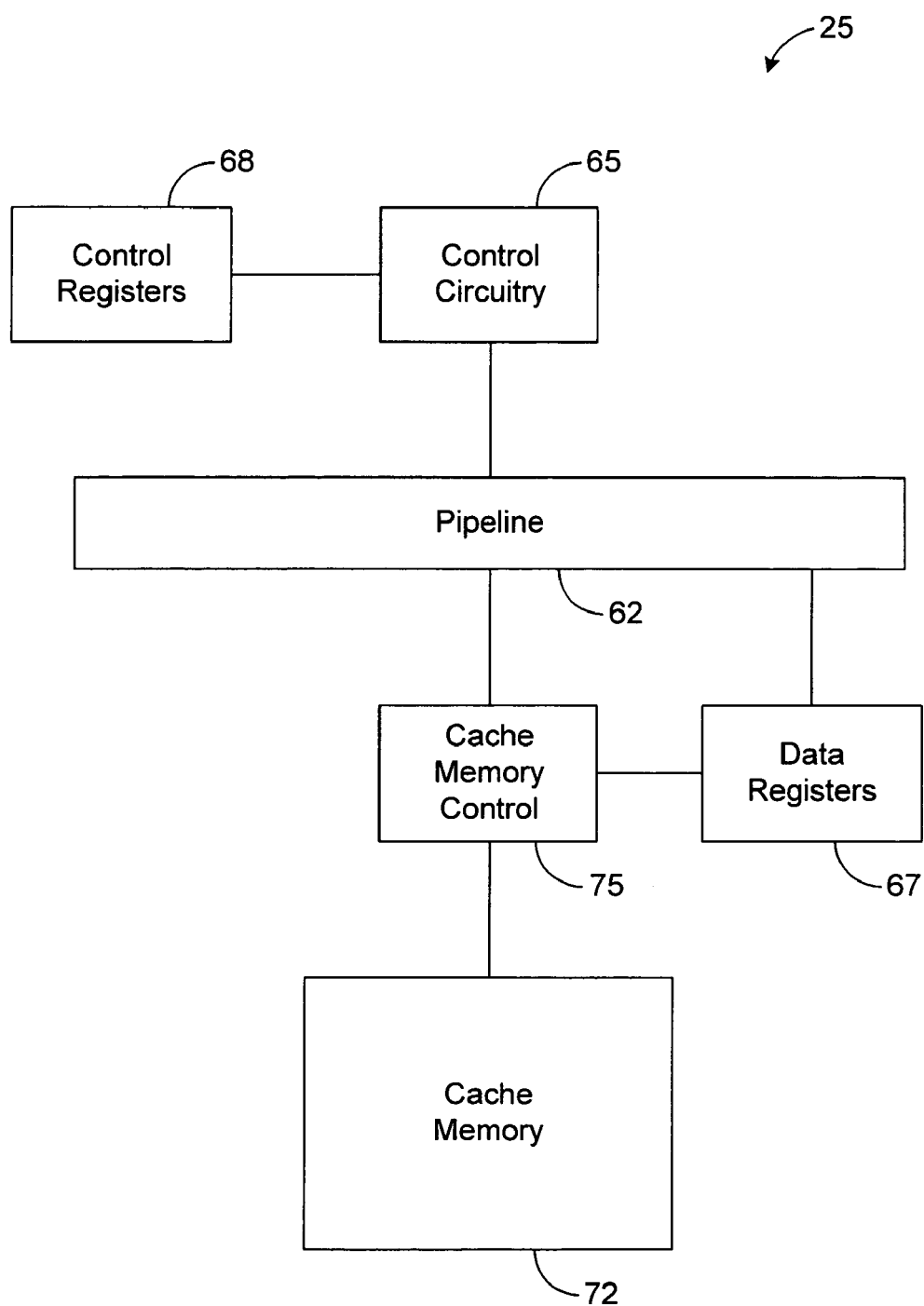
FIG. 2 is a block diagram illustrating a more detailed view of a processing unit depicted in FIG. 1.

FIG. 2 depicts a more detailed view of the processing unit 25. As shown by FIG. 2, the processing unit 25 includes at least one pipeline 62 or other type of processing circuitry that receives and processes instructions from computer programs 28 via techniques generally well known in the art. The pipeline 62 is coupled to control circuitry 65, which controls the operation of the pipeline 62. Control circuitry 65 may control various aspects and may perform various functionality. For example, the control circuitry 65 may analyze the instructions being processed by the pipeline 62 and determine when the instructions should be stalled. When one or more of the instructions should be stalled, the control circuitry 65 may transmit a disable signal to the pipeline 62, which then prevents further processing or execution of at least one instruction in response to the disable signal. When the stall is no longer necessary, the control circuitry 65 may remove the disable signal, and the processing of the stalled instruction or instructions may resume. It should be apparent to one skilled in the art that there are various other functionality that may be performed by the control circuitry 65.

As shown by FIG. 2, the processing unit 25 includes a plurality of data registers 67 that are used via conventional techniques to execute the instructions being processed by the pipeline 62. For example, to add two numbers together, the pipeline 62 may execute a first instruction that loads a first data value into a first data register 67, and the pipeline 62 may execute a second instruction that loads a second data value into a second data register 67. Then, the pipeline 62 may execute a third instruction that adds the contents of the first and second data registers 67 and stores the result in a third data register 67.

To adequately control the operation of the processing unit 25, the control circuitry 65 keeps track of various information, which is stored by the control circuitry 65 in one or more control registers 68. Such information is primarily used to control the operation of the processing unit 25 and is included within the processing unit's machine state.

The processing unit 25 also includes cache memory 72 that provides high speed access to data. In this regard, retrieving data from main memory 31 or other memory locations outside of processing unit 25 for use in executing instructions in the processing unit 25 takes a relatively long time. Therefore, when data is utilized in the execution of an instruction by the pipeline 62, it is desirable to store the data in cache memory 72. Since the cache memory 72 is located close to the other elements of the processing unit 25, the amount of time required to store data to and retrieve data from cache memory 72 in executing the instructions of the processing unit 25 is relatively short. By storing frequently used data in the cache memory 72, the amount of time required to access data used in the execution of many instructions can be significantly reduced, and the performance of the processing unit 25 can be thereby improved.

When the pipeline 62 executes an instruction (e.g., a write instruction) that stores a data value in main memory 31 or other memory location outside of processing unit 25, the pipeline 62 transmits the data value and the address where the data value is to be stored to cache memory control 75. In response to the data value and the memory address transmitted to the cache memory control 75, the cache memory control 75 is designed to determine whether data from the memory location identified by the foregoing memory address is stored in cache memory 72.

As described in the Background of the Invention section, the cache memory control 75 maintains in the cache memory 72 mappings indicating which memory addresses outside of processing unit 25 are respectively correlated with the data values stored in the cache memory 72. If one of the mappings identifies the address transmitted to the cache memory control 75 by the pipeline 62, the cache memory control 75 determines that data from the memory location identified by the foregoing address is stored in cache memory 72. In response to such a determination, the cache memory control 75 is designed to overwrite the foregoing data in cache memory 72 with the data value transmitted to the cache memory control 75 from the pipeline 62. At some later time, the memory location identified by the foregoing address transmitted to the cache memory control 75 is updated with the data value stored in the cache memory 75 and correlated with the foregoing address via the aforementioned mappings.

If none of the mappings in the cache memory 72 identifies the address transmitted to the cache memory control 75 by the pipeline 62, then the cache memory control 75 determines that the data from the memory location identified by the foregoing address is not stored in cache memory 72. In response, the cache memory control 75 transmits a retrieval request to memory system manager 52, which retrieves the data stored at the memory location identified by the foregoing address. This retrieved data is then stored in a cache line of the cache memory 72 by cache memory control 75, and the cache memory control 75 generates a new mapping indicating a correlation between this data value just stored in the cache memory 72 and the memory address from which the data value was retrieved. Then, the cache memory control 75 overwrites this data value with the data value transmitted to the cache memory control 75 from the pipeline 62. At some later time, the memory location identified by the foregoing address transmitted to the cache memory control 75 by the pipeline 62 is updated with the data value stored in the cache memory 75 and correlated with the foregoing address via the mappings in the cache memory 72.

When the pipeline 62 executes an instruction (e.g., a read instruction) that retrieves a data value, the pipeline 62 transmits to the cache memory control 75 the address identifying the location outside of processing unit 25 where the requested data value is stored. In response, the cache memory control 75 determines whether the requested data value is stored in cache memory 72. In this regard, the cache memory control 75 analyzes the mappings stored in cache memory 75. If one of the mappings identifies the address transmitted to the cache memory control 75 by the pipeline 62, then the cache memory control 75 determines that the requested data value is stored in the cache memory 72 and retrieves the requested data value by retrieving the data value at the location in cache memory 72 identified by the one mapping.

If none of the mappings in the cache memory 72 identifies the address transmitted to the cache memory control 75 by the pipeline 62, the cache memory control 75 determines that the requested data value is not stored in the cache memory 72. As a result, the data value should be retrieved from memory outside of processing unit 25, such as main memory 31. Therefore, cache memory control 75 issues a retrieval request, which includes the memory address of the location where the requested data value is stored. In response, memory system manager 52 retrieves the requested data value from a memory location outside of processing unit 25 based on the foregoing address and returns this data value to the processing unit 25. While the data value is being retrieved, the control circuitry 65 stalls any instructions in the pipeline 62 writing to or reading from the foregoing address.

As previously set forth in the Background of the Invention section, context switching can be used to enable multitasking. In this regard, the operating system 55, at various times, may determine that the computer program 28 being executed by the processing unit 25 should be switched. In response to such a determination, the operating system 55 transmits a context switch command to the processing unit 25 and to the memory system manager 52 indicating that a context switch should occur. In particular, this context switch command indicates that a first program 28 being executed by the processing unit 25 should be context switched out and that a second program 28 (i.e., the next program 28 to be executed) should be context switched in. As used herein, a "context switch command" is any set of data that indicates a context switch should occur. A context switch command may include one or more instructions that, when executed by the processing unit 25, cause the processing unit 25 to perform a context switch. However, it is not necessary for the context switch command to include any instructions executable by the processing unit 25 provided that the processing unit 25 is configured to perform context switching without such instructions being transmitted from the operating system 118.

In response to the context switch command, the memory system manager 52 stops transmitting instructions from the first program 28 being executed by the processing unit 25 and starts transmitting instructions from the second program 28. Furthermore, the control circuitry 65 transmits the contents of control registers 68 to memory system manager 52, which stores the contents in memory outside of processing system 25.

At some later time, the operating system 55 determines that the first computer program 28, which was previously context switched out as described above, should be context switched in via another context switch. Therefore, the operating system 55 transmits a context switch command to the processing unit 25 and to the memory system manager 52 indicating that a context switch should occur. In response, the program 28 executing immediately prior to this context switch is context switched out, according to the techniques described above, and the first computer program is context switched in. In this regard, the aforementioned contents from control registers 68, which were stored in memory outside of processing unit 25 in response to the previously described context switch (i.e., when the first program 28 was context switched out), are now retrieved from memory outside of the processing unit 25 by memory system manger 52 and are loaded into control registers 68. Then, instructions from the first computer program 28 are transmitted to the processing unit 25 for execution.

At this point, execution of the first program 28 resumes at a point where execution was interrupted when the first program 28 was previously context switched out. However, since other programs 28 have been executed by the processing unit 25 since the first program 28 was previously context switched out, it is likely that the data presently stored in the cache memory 72 is associated with programs 28 other than the first program 28 being context switched in. Therefore, as the first program 28 executes, it is likely that numerous stalls will initially occur as the data utilized in the execution of the first program 28 is retrieved from memory stored outside of processing unit 25 and stored in the cache memory 72 in response to execution of instructions from the first program 28.

Figure 3:
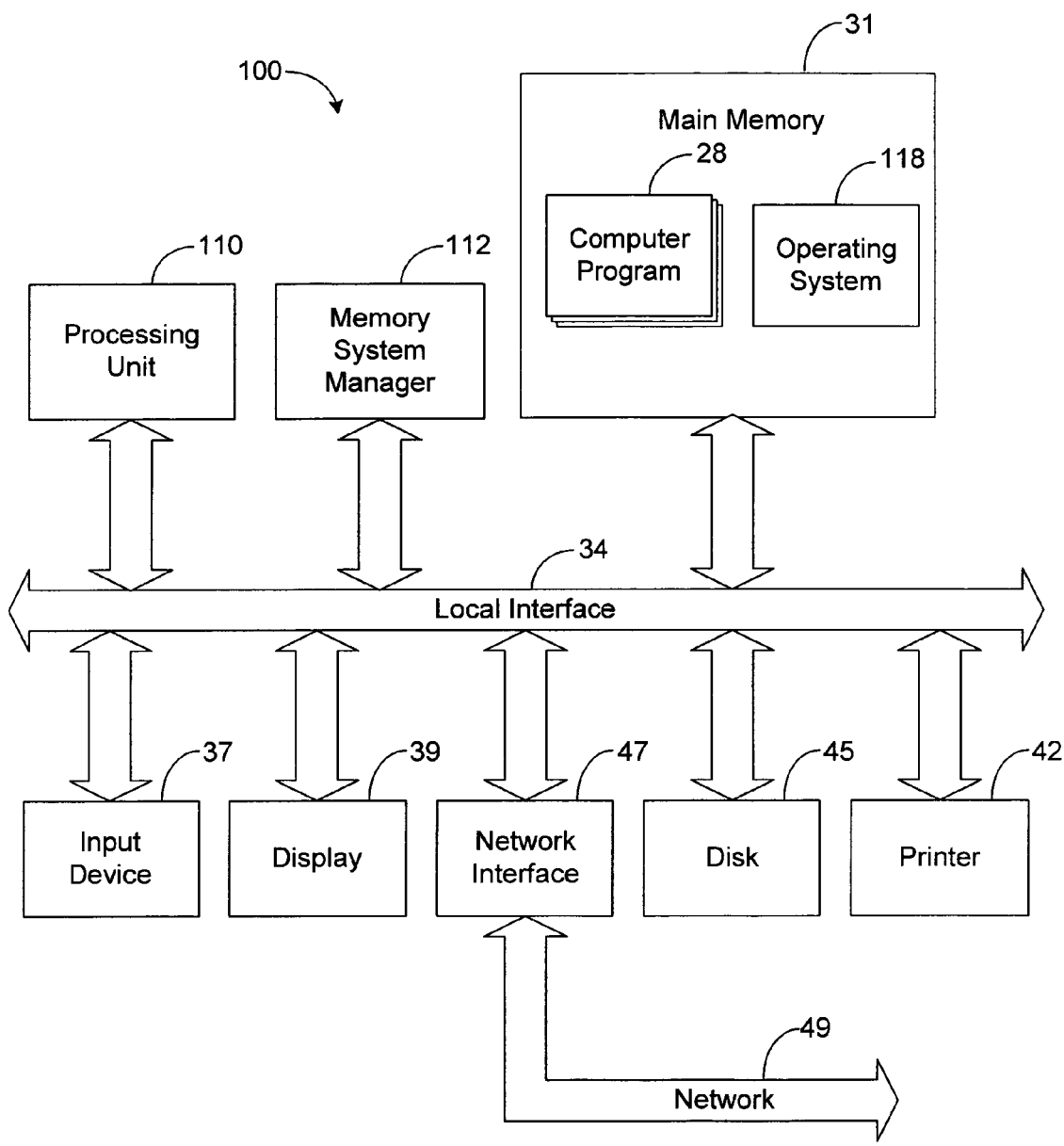
FIG. 3 is a block diagram illustrating a computer system in accordance with the present invention.

FIG. 3 depicts a computer system 100 that employs a processing unit 110 designed in accordance with the principles of the present invention. Like conventional computer system 20, system 100 preferably includes main memory 31, programs 28, a local interface 34, an input device 37, a display device 39, a disk storage mechanism 45, a printer 42, and a network interface 47 that may interface the system 100 with a network 49. The preferred embodiment of the system 100 also includes a memory system manager 112 and an operating system 118. Except as otherwise described hereinafter, the processing unit 110, the memory system manager 112 and the operating system 118 are configured identical to and operate the same as the processing unit 25, the memory system manager 52, and the operating system 55, respectively.

The memory system manager 112 and the operating system 118 can each be implemented in software, hardware, or a combination thereof. In the preferred embodiment, as illustrated by way of example in FIG. 3, the memory system manager 112 is implemented via hardware that is interfaced with the local interface 34, and the operating system 118 is implemented in software and stored in main memory 31.

Figure 4:
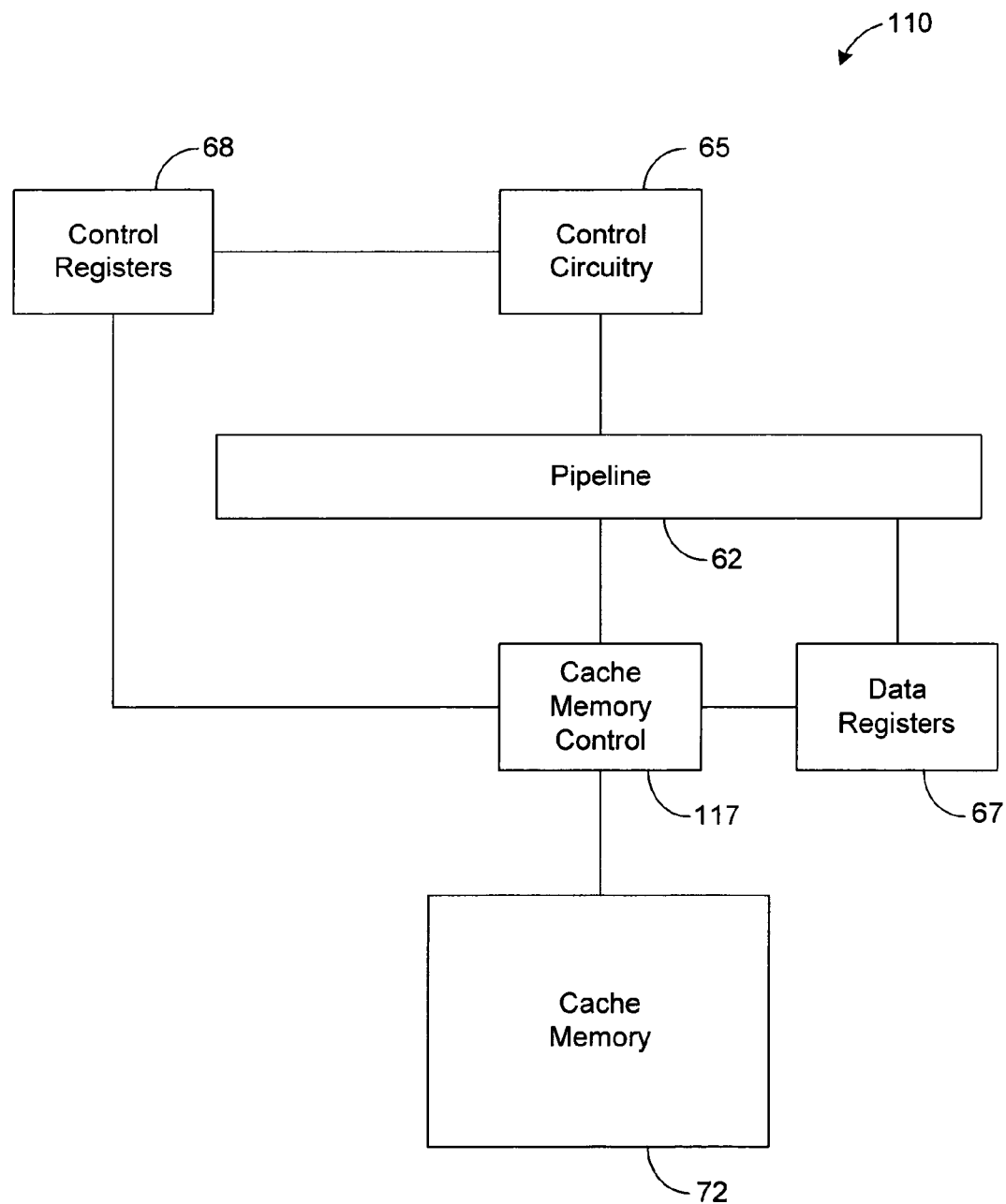
FIG. 4 is a block diagram illustrating a more detailed view of a processing unit depicted in FIG. 3.

As shown by FIG. 4, the processing unit 110, similar to conventional processing unit 25, includes one or more pipelines 62 or other processing circuitry, data registers 67, control registers 68, control circuitry 65, and cache memory 72. The processing unit 110 also includes cache memory control 117. Except as otherwise described hereinafter, the cache memory control 117 is configured identical to and operates the same as conventional cache memory control 75.

While a program 28 is executing, the cache memory control 117 tracks how often each cache line is utilized in executing the instructions of the program 28. Information indicating which cache lines in the cache memory 72 have been recently utilized is preferably stored as control data in the control registers 68, although this information may be stored in another location, if desired. This information is stored in memory outside the processing unit 110 when the foregoing program 28 is context switched out during a first context switch and is later loaded into the control registers 68 when the foregoing program 28 is context switched in during a second context switch. Based on this information, the cache memory control 117 determines which data values were recently used in executing the program 28 prior to the first context switch (i.e., prior to being context switched out) and issues data requests for these data values as execution of the program 28 is commenced after the second context switch.

Therefore, the process for loading these data values into the cache memory 72 is initiated before these data values are requested via execution of instructions by the pipeline 62. In other words, the data values are preloaded into the cache memory 72, since they are loaded in response to the occurrence of the second context switch instead of being loaded in response to an execution of an instruction by the pipeline 62. As a result, when an instruction that requests or utilizes one of the foregoing data values is processed by the pipeline 72, it is likely that the data value will already be stored in the cache memory 72, thereby preventing the need to retrieve the data value from memory outside of processing unit 110.

To better illustrate the principles of the present invention, assume that a first computer program 28 is being executed by the processing unit 110. As in conventional systems 20, data is stored in cache memory 72 as the first program 28 executes. One or more data values may be stored in each cache line of the cache memory 72.

Figure 5:
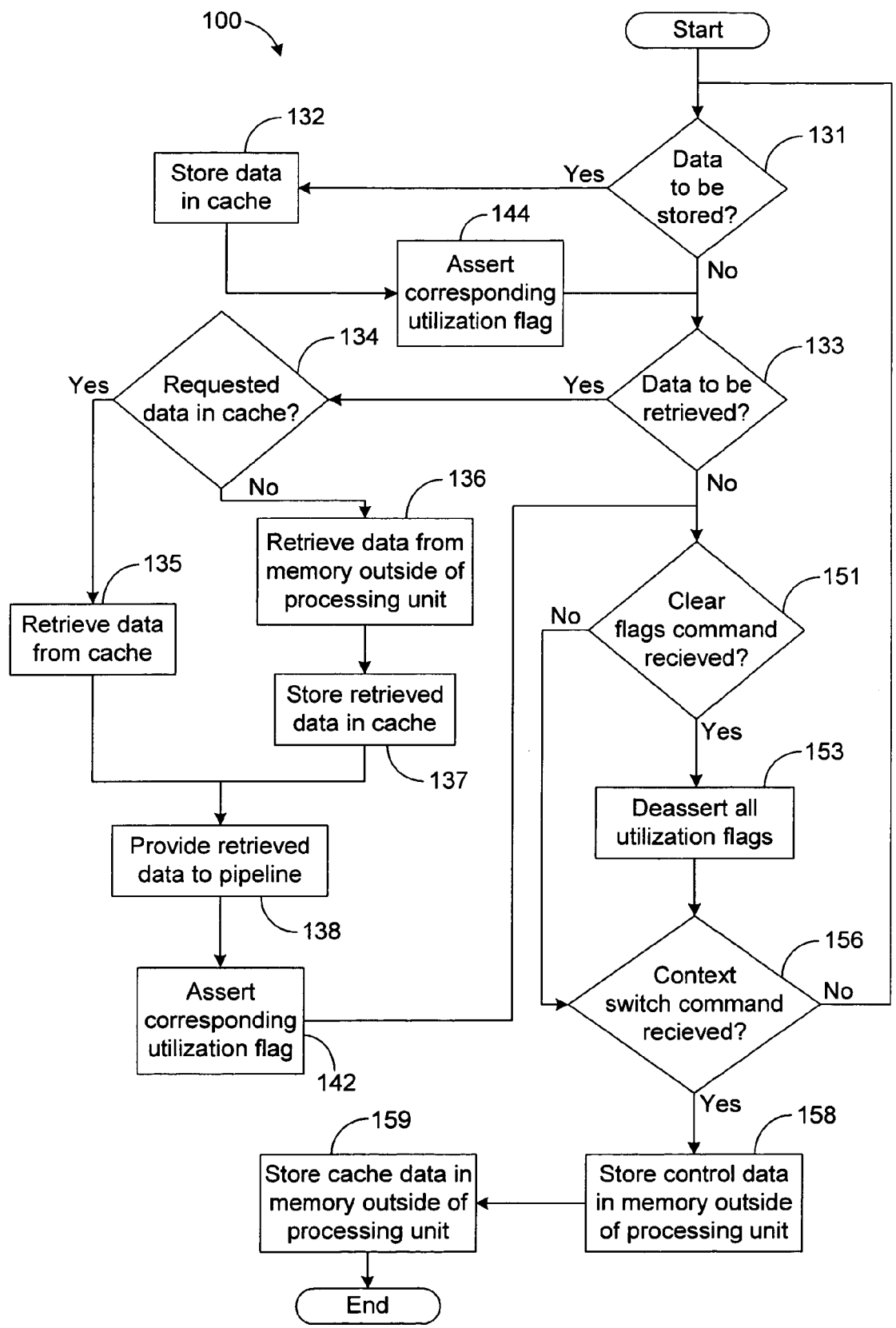
FIG. 5 is a flow chart illustrating the architecture and functionality of the computer system depicted in FIG. 3 in executing computer programs.

In the preferred embodiment of the present invention, each cache line is preferably correlated with a bit of information, referred to hereafter as a "utilization flag," which is stored in the control registers 68. The utilization flags are initially deasserted. While the first program 28 is executing, data is retrieved out of and stored into cache memory 72, according to the techniques previously described for conventional system 20, as represented by blocks 131–138 of FIG. 5. However, whenever a data value is retrieved from or stored to cache memory 72, the cache memory control 117 is designed to assert the utilization flag correlated with the cache line containing the retrieved or stored data value, as indicated by blocks 142 and 144.

The operating system 118 is preferably designed to periodically (e.g., every ten milliseconds) transmit a utilization flag clear command to the cache memory control 117. In response to this command, the cache memory control 117 is designed to deassert each of the utilization flags, as shown by blocks 151 and 153. Therefore, the only utilization flags that should be asserted are the flags that are correlated with cache lines containing at least one data value that has been retrieved from or stored to cache memory 72 since the last received utilization flag clear command. Accordingly, only the utilization flags correlated with cache lines containing at least one recently utilized (i.e., retrieved or stored) data value should be asserted.

At some point, the first program is likely to be context switched out during a context switch referred to hereafter as "the first context switch." When the first program 28 is context switched out, the cache memory control 117 is designed to transmit a request to memory system manger 112 to store certain control information to memory outside of processing unit 110, as shown by blocks 156 and 158. Included in this control information are the utilization flags presently stored in the control registers 68 and the mappings presently stored in the cache memory 72. These mappings indicate the addresses outside of processing unit 110 that are correlated with the data values presently in cache memory 72. During each context switch, each data value stored in the cache memory 72 is preferably stored in the memory address correlated with the data value by the mappings stored in the cache memory 72, as shown by block 159.

Figure 6:
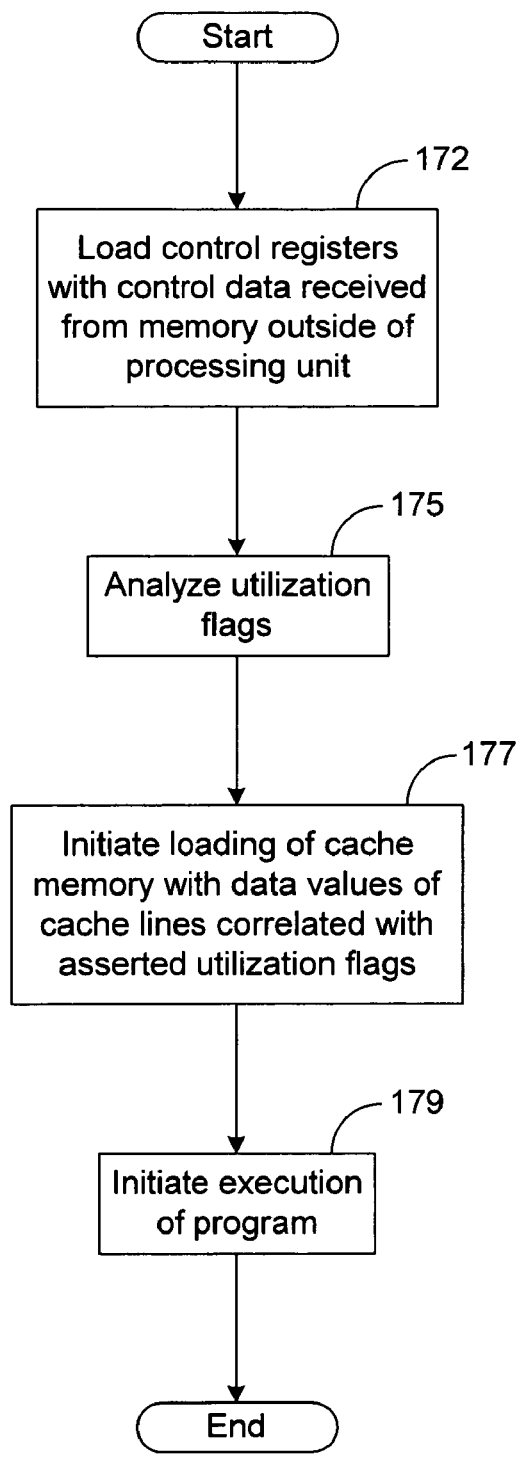
FIG. 6 is a flow chart illustrating the architecture and functionality of the computer system depicted in FIG. 3 in performing a context switch.

After the first context switch is complete and the first program 28 is context switched out, one or more programs 28 may be sequentially executed by the processing unit 110. However, at some point, the first program 28 should be context switched in by the operating system 118 during a context switch referred to hereafter as "the second context switch." When this occurs, the aforementioned control data previously stored outside of processing unit 110 during the first context switch is provided to processing unit 110, as shown by block 172 of FIG. 6. In this regard, the memory system manager 112, in response to a context switch command from the operating system 118, is designed to retrieve the control data and to transmit the control data to the processing unit 110 during the second context switch. The cache memory control 117 then stores the utilization flags in the control registers 68 and the mappings in the cache memory 72.

Then, the cache memory control 117 analyzes the utilization flags in order to select for preloading the data values that were recently retrieved from or stored to the cache memory 72 in response to an executing instruction just prior to the first context switch, as shown by block 175. To this end, each cache line correlated with an asserted utilization flag should have included at least one such data value before the first context switch. Based on the mappings now stored in the cache memory 72 (i.e., the mappings stored in the cache memory 72 during the second context switch), the cache memory control 117 then issues one or more retrieval requests for the data value or data values of each cache line correlated with an asserted utilization flag. In response, the memory system manager 112 retrieves the requested data values, and these data values are then stored in the cache memory 72, as indicated by block 177. These data values should be the data values that were stored in the cache lines correlated with asserted utilization flags just prior to the first context switch. In other words, these data values should be data values that were recently utilized in executing the first program 28 just prior to the first context switch.

The retrieval of the foregoing data values can be commenced prior to or during the execution of the first program 28 by the processing unit 110 that occurs subsequent to the second context switch. Therefore, before or during execution of the first program 28 that occurs subsequent to the second context switch (i.e., after the first program has been context switched in), the data values recently used in the execution of the first program 28 prior to the first context switch (i.e., prior to the first program 28 being context switched out) are preloaded into the cache memory 72 as shown by blocks 177 and 179. In other words, the data values recently used in the execution of the first program 28 prior to the first context switch are loaded into the cache memory 72 in response to the occurrence of the second context switch. Therefore, it is likely that many of the data values initially manipulated (i.e., retrieved or overwritten) by execution of the first computer program 28 after the second context switch will already be stored in the cache memory 72 before these data values are requested via the execution of instructions utilizing the data values. As a result, the number of stalls that initially occur after first program 28 is context switched in are likely to be reduced.

It should be noted that different data values may be selected for preloading into the cache memory 72 in other embodiments. For example, when a program 28 is context switched in, it is possible to preload into the cache memory 72 all of the data values that were previously stored in the cache memory 72 when the program 28 was previously context switched out. However, such an embodiment is not optimal, since many data values that were not recently used prior to the associated context switch out would be preloaded.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A computer system for efficiently executing instructions of computer programs, comprising:

processing circuitry having a pipeline, said pipeline configured to execute instructions from one of a plurality of programs, said processing circuitry configured to stop executing said one program during a first context switch in response to a first context switch command and to resume executing said one program during a second context switch in response to a second context switch command;

cache memory;

computer memory having a plurality of addresses; and memory control circuitry coupled to said processing circuitry, said memory control circuitry configured to store, in response to said first context switch command, in computer memory, data written by said pipeline during execution of said one program and to store an indicator indicative of whether said data was accessed by the processing circuitry during a particular time period prior to said first context switch in executing said instructions from said one program, said memory control circuitry, in response to said second context switch command, configured to identify one of said addresses of said computer memory that is storing said indicator corresponding to said data previously written by said pipeline during execution of an instruction of said one computer program prior to said first context switch, said memory control circuitry further configured to make a determination, based on said indicator, whether said data was accessed by the processing circuitry in the particular time period prior to the first context switch for determining whether to preload said data into said cache memory in response to said second context switch, to retrieve said data, based upon said determination, from said computer memory in response to said second context switch command, and to store said retrieved data in said cache memory based upon said indicator.

2. The system of claim 1, wherein said processing circuitry is further configured to execute instructions of another of said computer programs in response to said first context switch command.

3. The system of claim 1, wherein said memory control circuitry is configured to maintain a plurality of mappings, each of said mappings respectively correlating data stored in said cache memory with one of said memory addresses of said computer memory, said memory control circuitry further configured to maintain a bit of information that is associated with one of said mappings, said memory control circuitry configured to assert said bit when a data value correlated with a computer memory address via said one mapping is utilized to execute an instruction of said one program, said memory control circuitry further configured to deassert said bit periodically.

4. The system of claim 3, wherein said memory control circuitry is further configured to determine, in response to said second context switch command and based on said bit, whether said data value was recently utilized by said processing circuitry to execute an instruction prior to said first context switch.

5. The system of claim 4, wherein said memory control circuitry is further configured to store said mappings and said bit to said computer memory in response to said first context switch command and to retrieve said mappings and said bit from said computer memory in response to said second context switch command.

6. The system of claim 1, wherein said memory control circuitry stores said data and said indicator in response to said first context switch while said processing circuitry executes a second program and upon termination of execution of said second program, said memory control circuitry preloads said data, based upon said indicators, into said cache memory prior to executing said one program.

7. The system of claim 1, wherein said memory control circuitry is configured to retrieve said data, based upon said determination, from said computer memory in response to said second context switch command before any instruction in said one program requests said data subsequent to said second context switch.

8. A computer system for efficiently executing instructions of computer programs, comprising:

processing circuitry having a pipeline, said pipeline configured to execute instructions from one of a plurality of programs, said processing circuitry configured to stop executing said one program during a first context switch in response to a first context switch command and to resume executing said one program during a second context switch in response to a second context switch command;

cache memory;

computer memory having a plurality of addresses; and memory control circuitry coupled to said processing circuitry, said memory control circuitry configured to maintain a plurality of mappings, said mappings respectively correlating at least one data value previously written by said pipeline during execution of an instruction and stored in said cache memory with said memory addresses of said computer memory, said memory control circuitry configured to store in said computer memory said mappings and information indicating whether said at least one data value was recently accessed and to make a determination, based on said information, whether said information indicates that said at least one data value was recently accessed prior to the first context switch, said memory control circuitry further configured to preload, into said cache memory, said at least one data value based on said determination if said information indicates that said at least one data value was recently accessed prior to said first context switch.

9. The system of claim 8, wherein said processing circuitry is further configured to execute instructions of another of said computer programs in response to said first context switch command.

10. The system of claim 8, wherein said memory control circuitry is further configured to store said information in said computer memory in response to said first context switch command and to retrieve said information and said mappings in response to said second context switch command.

11. The system of claim 8, wherein said information has a plurality of bits respectively associated with said mappings, wherein said memory control circuitry, for each data value accessed by said memory control circuitry, is configured to assert the bit associated with the mapping that correlates said each data value with one of said computer memory addresses, and wherein said memory control circuitry is configured to periodically deassert each of said plurality of bits.

12. A method for efficiently executing instructions of computer programs, comprising the steps of:

executing instructions from a computer program;

halting said executing step during a first context switch in response to a first context switch command;

resuming said executing step during a second context switch in response to a second context switch command;

maintaining a plurality of mappings;

correlating, via said mappings, data values previously written by a pipeline during the executing step and stored in a cache memory with memory addresses of computer memory outside of said cache memory;

storing said mappings in said computer memory in response to said first context switch command and information indicative of whether said data values were accessed during a particular time period prior to said first context switch;

selecting, based on said information and for preloading into the cache memory in response to the second context switch command, at least one data value from at least one of said addresses identified by said mappings;

retrieving, based on said mappings and said selecting step, said at least one data value in response to said second context switch command if said information indicates that said at least one data value was accessed during said particular time period; and storing said at least one retrieved data value in said cache memory.

13. The method of claim 12, further comprising the steps of:

storing said information in said computer memory in response to said first context switch command; and retrieving said information and said mappings in response to said second context switch command.

14. The method of claim 12, wherein said information has a plurality of bits respectively associated with said mappings, and wherein said method further comprises the steps of:

asserting each of said bits associated respectively with each of said mappings that identifies a data value accessed in response to said executing step; and periodically deasserting each of said bits.

15. A computer system for efficiently executing instructions of computer programs, comprising:

computer memory; and a processing unit comprising cache memory and logic configured to store in said computer memory a value indicative of whether a portion of said cache memory was recently accessed by said processing unit and a mapping associated with said value, said mapping indicative of a location in said computer memory storing data previously requested or previously written by an instruction of a first process being executed by the processing unit when the processing unit context switches out the first process for processing of a second process, the logic further configured to select said data for preloading in said cache memory after said second context switch if said value indicates that the data was recently accessed, retrieve said data based on said value and store said data in said cache if said value indicates that the data was recently accessed, said processing unit continuing execution of said first process with the retrieved data when the processing unit context switches out the second process and context switches in the first process.

16. A method for efficiently executing instructions of computer programs, comprising the steps of:

storing a value indicative of whether data in cache memory was recently accessed by a processing unit;

storing in said memory a mapping corresponding to said value, said mapping indicative of a location in computer memory storing said data when the processing unit context switches out the first process for processing of a second process;

determining whether said data was recently accessed prior to said processing unit switching out the first process; and preloading, based on said determining step, said data in said cache for execution of said first process by said processing unit if said value indicates that the data was recently accessed in said determining step.

17. The system of claim 16, wherein said cache memory comprises a cache line.

18. The system of claim 17, wherein said value is indicative of whether said processing unit has accessed said cache line during a particular time period.

19. The system of claim 18, wherein said value indicative of said cache memory usage is defined by a flag, said logic configured to assert said flag when said first process uses said cache line.

20. The method of claim 16, wherein said cache memory comprises a cache line.

21. The method of claim 20, wherein said value is indicative of whether said processing unit has accessed said cache line during a particular time period.

22. The method of claim 20, further comprising the step of asserting a flag when said first process uses said cache line.

* * * * *